United States Patent [19]
Richens et al.

[11] 3,792,639
[45] Feb. 19, 1974

[54] KEY MACHINE DRIVE

[75] Inventors: Robert H. Richens, Macedonia; Charles A. Garner, Strongsville, both of Ohio

[73] Assignee: Cole National Corporation, Cleveland, Ohio

[22] Filed: Nov. 20, 1972

[21] Appl. No.: 308,284

[52] U.S. Cl. ............................................. 90/13.05
[51] Int. Cl. .............................................. B23c 3/35
[58] Field of Search ................................... 90/13.05

[56] References Cited
UNITED STATES PATENTS
3,625,111  12/1971  Carlo et al. .......................... 90/13.05

*Primary Examiner*—Francis S. Husar
*Attorney, Agent, or Firm*—Woodling, Krost, Granger & Rust

[57] ABSTRACT

A key machine drive is disclosed wherein a cam drum with first, second and third sections of a cam track have different pitches and cross each other to establish a small compact drive for the key machine and which may establish an automatic cycle of the cutting action of the key machine. The foregoing abstract is merely a resume of one general application, is not a complete discussion of all principles of operation or applications, and is not to be construed as a limitation on the scope of the claimed subject matter.

10 Claims, 6 Drawing Figures

PATENTED FEB 19 1974

KEY MACHINE DRIVE

BACKGROUND OF THE INVENTION

The key machines of the prior art have generally been of two types either a manual machine or an automatic machine. The manual machine is generally small and compact because an electric motor therein has been used to drive only the cutter wheel. The automatic machines have had some form of drive means to relatively move the cutter and the key and in general these automatic machines have been rather large and bulky. A reason for this is that most electric motors in order to have sufficient power in a small size are generally high speed motors. This means that for the slow speed movement of the key relative to the curve, this high speed must be greatly reduced by means of some speed reducing drive. If a gear drive is provided, this is often noisy and bulky and has the further disadvantage that only a single speed of the key relative to the cutter may be easily provided. This single speed is a disadvantage because it must operate at a slow feed speed for the entire forward and backward movements. Another prior art attempt was to use a cam in order to get the speed reduction for the relative movement of the cutter and key, however, this also provided generally a single slow feed speed. Another possible solution was to use a disc cam with one cycle per revolution to achieve the longitudinal movement between the cutter and key. However, again this required an extraordinarily large disc cam in order to achieve the proper large speed reduction from the high speed motor to the slowly moving cutter or key.

Accordingly, an object of the invention is to obviate the above-mentioned disadvantages.

Another object of the invention is to provide a key machine drive which is small, compact and yet which provides both a rapid traverse movement and a slow feed speed.

Another object of the invention is to provide a key machine drive wherein cam means is provided to effect the longitudinal drive between the cutter and key and which cam has a cam track thread of two different pitches and crossing itself to achieve a small compact drive with a large speed reduction.

SUMMARY OF THE INVENTION

The invention may be incorporated in a key machine drive, comprising in combination, a frame, a carriage longitudinally movable on said frame, key vise and cutter means mounted for relative longitudinal movement therebetween in accordance with longitudinal movement of said carriage, rotatable cam means having a cam track, motive means connected to rotate said cam means, a cam follower cooperable with said cam, means connecting one of said cam and follower to said carriage to impart movement thereto upon rotation of said cam, said cam track having a continuous thread of first and second sections, said first section extending from near a first end to near a second end of said cam means and being of a first pitch for rapid traverse movement of said carriage, and said second section crossing said first section at an angle and being of a second pitch less than said first pitch for slow feed movements for cutting of a key by the cutter means.

Other objects and a fuller understanding of the invention may be had by referring to the following description and claims, taken in conjunction with the accompanying drawing.

DESCRIPTION OF THE PREFERRED EMBODIMENT

Figure 1:
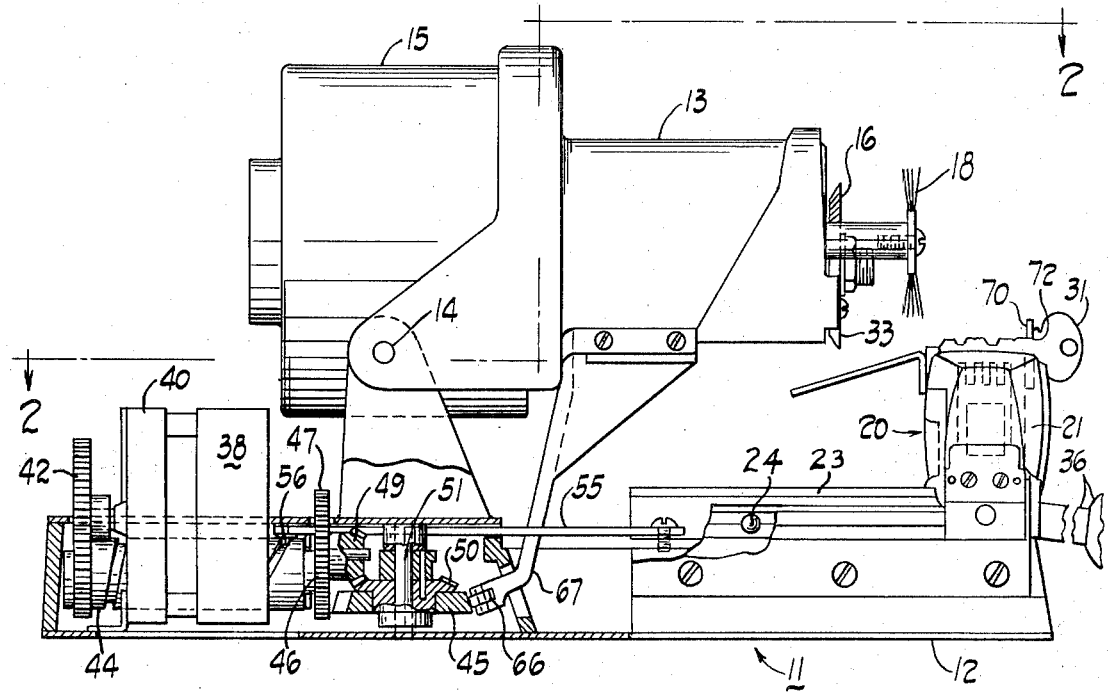
FIG. 1 is a side elevational view partly in section of a key machine embodying the invention.
Figure 2:
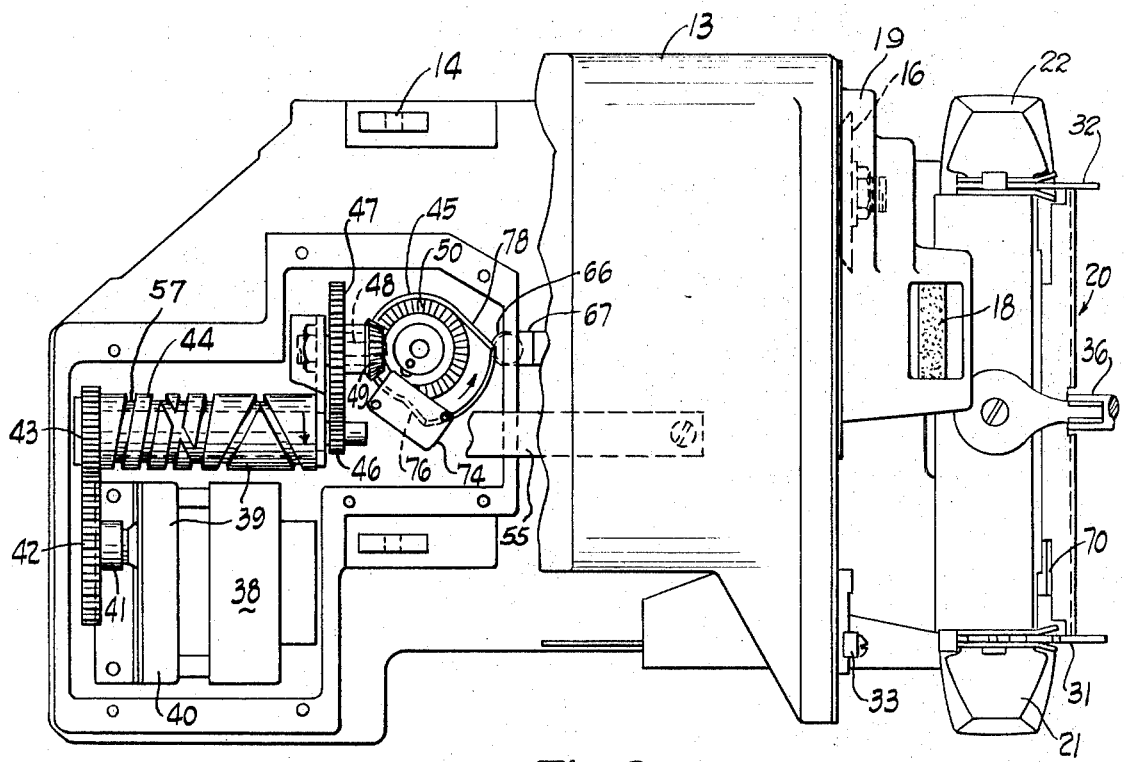
FIG. 2 is a sectional view on line 2—2 of FIG. 1.
Figure 3:
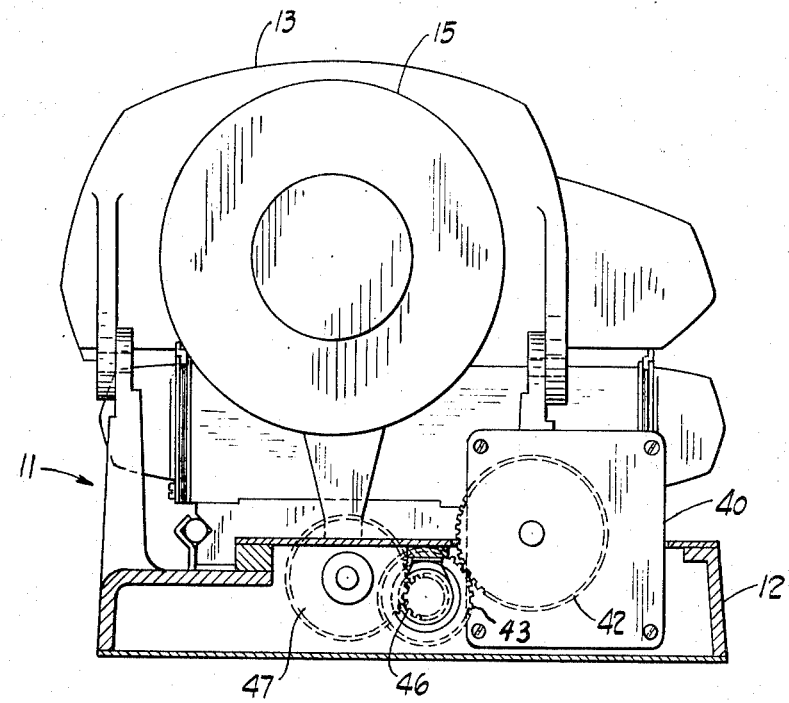
FIG. 3 is a rear elevational view partly in section of the machine of FIG. 1.

The drawing figures illustrate the preferred embodiment of a key machine 11 having a main frame 12. A cutter head 13 is mounted on the frame 12 for lateral movement by being pivoted at the pivots 14. A motor 15 is mounted on the cutter head 13 and drives a milling cutter 16 through speed reducing gearing and also drives directly a brush 18. A cover 19 for the cutter 16 and brush 18 is shown in FIG. 2, but shown removed in FIG. 1.

A vise structure 20 is provided on the machine 11 and this vise structure includes a first vise 21 and a second vise 22. The vise structure 20 includes a vise frame 23 which is mounted for longitudinal reciprocation relative to the machine frame 12 by means of a ball track 24. The vise frame may also be considered a carriage to mount keys for longitudinal movement relative to the cutter 16. To this end the first vise 21 may mount a master key 31 and the second vise 22 may mount a key blank 32 to be acted on by the cutter 16. A stylus 33 on the cutter head 13 cooperates with the master key which already has the proper bits or notches to be copied. Accordingly, the carriage or vise frame 23 provides the relative longitudinal movement between the keys and the cutter and the pivot 14 pivoting the cutter head 13 provides the relative lateral movement between the key and the cutter in order to copy or duplicate on the key blank 32 the shape of the bits or notches on the master key 31. The vise structure 20 may be any of several types and in this preferred embodiment includes a handle 36 which is shown in a clamped position in FIG. 1. When this handle 36 is moved downwardly about 45° to the position of FIG. 1, it acts through a mechanical advantage means to cause the vises to securely clamp the keys.

A motor 38 and speed reducing means 39 is provided in the machine 11 to establish the aforementioned relative longitudinal and lateral movement between the cutter and key. The motor is a small high speed electric motor and the speed reducing means 39 includes a gear speed reducer 40 attached to this motor 38. The gear reducer 40 has an output at 41 driving a gear 42 in turn driving a pinion 43. The speed reducing means 39 further includes cam means including a drum cam 44 and a disc cam 45. The drum cam and disc cam 44 and 45 are journalled for rotation on the machine frame 12 and a pinion 46 is fixed on the other end of the drum cam 44. Pinion 46 meshes with a gear 47 fixed on a shaft 48 journalled in the frame 12. Also fixed on this shaft 48 is a bevel gear 49 which meshes with another bevel gear 50 secured to the disc cam 45 to rotate this cam about a shaft 51 in the frame 12.

A cam follower bar 55 is secured to the carriage 23 and pivoted to this bar 55 is a cam follower 56 which cooperates with a cam track 57 on the drum cam 44. This cam track 57 has first, second and third sections, 61, 62 and 63, respectively, extending as a single continuous cam track. As best shown in the enlarged FIGS. 5 and 6 the cam follower 56 has a pivot 58 extending through an aperture 59 in the cam follower bar 55. This cam follower 56 also has a partially cylindrical undersurface 60 to ride in the cam track 57 on the cam drum 44.

A cam follower 66 coacts with the disc cam 45 and is a roller pivotally mounted on a leg 67 depending from the cutter head 13. Actions of the cam 45 on the cam follower 66 cause the cutter head 13 to raise lower around the pivots 14. The keys 31 and 32 are longitudinally positioned by a shoulder gauge 70 coacting with a shoulder 72 on the keys.

OPERATION

The key machine 11 shows a preferred embodiment of the invention in which an automatic cycle is possible. A master key 31 will be positioned in the first vise 21 and a key blank 32 to be cut will be positioned in the second vise 22. The handle 36 may be depressed to the position shown in FIG. 1 to clamp these keys in the vises. The shoulder gauge 70 may be used to longitudinally position the keys for the proper position in the machine 11. A switch, not shown, may be actuated to start a single cycle of operation of the machine 11. This switch starts both motors 15 and 38. The motor 15 starts rotation of the cutter 16 and keeps it energized throughout the cycle so that the cutter will be ready to cut the key blank 32. The rotation of the motor 38 provides a drive for relative longitudinal movement and relative lateral movement between the cutter 16 and the keys 31, 32. Before the cutting cycle starts, the cam follower 66 will cooperate with the disc cam 45 in the position shown in FIG. 2. This raises the cutter head 13 slightly from the position shown in FIG. 1 so that the axis is not horizontal, instead it is perhaps 5° inclined to the horizontal. This makes sure that cutter 16 is raised above the key blank 32 for the entire inward movement of the vise frame or carriage 23. The disc arm 45 rotates counterclockwise as viewed in FIG. 2 and the upper surface of the drum cam 44 moves downwardly in rotation as viewed in FIGS. 2 and 4. This is as shown by the arrows on these parts. The cam follower 56 initially starts in the position shown in FIGS. 1 and 4 at the start of the cycle. During rotation of the drum cam 44, the cam folower 56 follows the single continuous cam track 57 which includes the first, second and third sections 61-63. An automatic cutting cycle of the machine 11 is established by a single rotation of the disc cam 45 after which a switch 74 is actuated to terminate this cycle. Also, this single cycle includes seven full revolutions of the drum cam 44. During the first two-sevenths of the cycle, the drum cam 44 makes two revolutions and hence the cam follower 56 is moved from near one end of this cam to near the other end of this cam to a position 75. This gives a rapid traverse forward movement of the carriage 23 to bring the shoulder 72 of the key closely adjacent to cutter 17. Also during this 2/7ths of the cycle, the disc cam 45 will have rotated about 103° and during the last few degress of this movement the cam follower 66 will ride down a cam slope 76 to lower the cutter head 13 so that the cutter 16 starts to cut into the key blank 32 as dictated by the stylus 33 engaging the master key 31. At this time, the cam follower 56 is at position 75 whereat the first section 61 merges smoothly with the second section 62 of the cam track 57. During this travel of the cam follower 56 on the second section 62, the carriage 23 is caused to move slowly back to the right as viewed in FIGS. 1 and 2 for a slow feed movement of the carriage. Cam follower 66 does not touch the cam 45 at this time, in order to permit the stylus 33 and master key 31 to control the lateral movement of the cutter 16. This continues for four revolutions of the drum cam 44 or four-sevenths of the cycle which is about 206° on the disc cam 45. At this time the cam follower 56 will be at a position 77 on the drum cam 44 and this will have provided sufficient feed movement of the carriage 23 so that the entire length of the key 32 will have been cut as a duplication of the master key 31. During the remaining one full revolution of the drum cam 44, the cam follower 56 will ride on the third section 63 of the cam track 57 to rapidly traverse the carriage 23 forwardly to a starting position. This is for one-seventh of the total cycle of the machine which is about 51°. During this one-seventh of the cycle the disc cam 45 rotates one-seventh of a revolution and a cam slope 78 thereon coacts with the cam follower 66 to gradually raise the cutter head 13 from the position shown in FIG. 1 to a slightly elevated position. The switch 74 is actuated at the end of this full revolution of the cam 45 to terminate the automatic cutting cycle. The keys 31 and 32 may then be removed from the vise structure 20 by raising the handle 36.

Figure 5:
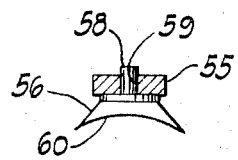
FIG. 5 is an enlarged side view of the cam follower.
Figure 6:
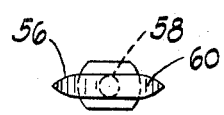
FIG. 6 is an enlarged bottom view of this cam follower.
Figure 4:
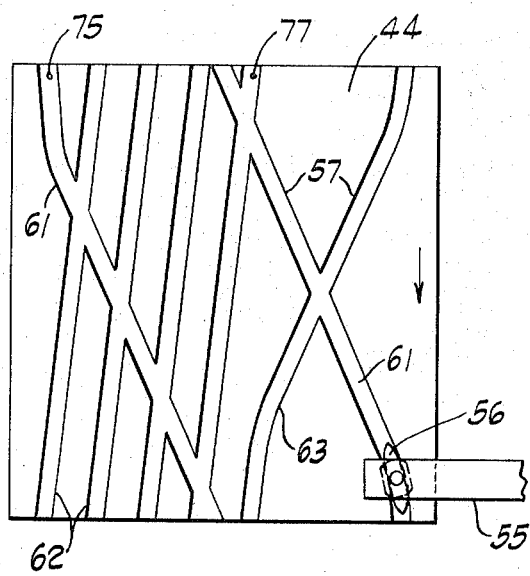
FIG. 4 is an enlarged developed view of the cam means.

It will be observed from FIG. 4 that the first section 61 of the cam track 57 has a first pitch for rapid traverse and the second section 62 has a second pitch less than that of the first pitch to establish the previously mentioned slow feed movements. Further, it will be observed that the third section 63 has a pitch greater than that of the second pitch to rapidly traverse the carriage to the starting position. Both the second and third sections 62 and 63 cross the first section 61 and this crossing of the sections of the cam track establishes cam means which is exceedingly small and compact for the force developed thus enabling the entire machine 11 to be kept small. FIGS. 5 and 6 show that the cam follower 56 has about a 90° arcuate extent of the partly cylindrical surface 60 and has pointed ends. This permits the cam follower 56 to follow its particular cam track section such as section 61 without any false entrance into the other sections such as 62 or 63 which it crosses. This establishes a positive and safe drive of the key machine 11. The cam track 57 is a helical path on the drum cam 44 which helical path changes pitch among the various sections. The pivoting of the cam follower 56 on pivot 58 relative to the cam follower bar 55 permits this cam follower to pivot to follow the changing pitch of this cam track 57. Gears 46–50 interconnecting the cams 44 and 45 synchronize the movement of these two cams so that during one complete cycle the disc cam 45 provides relative lateral movement between the cutter and the key and cam 44 provides relative longitudinal movement between the cutter and the key.

The present disclosure includes that contained in the appended claims, as well as that of the foregoing de-

What is claimed is:

1. A key machine drive, comprising in combination, a frame,
a carriage longitudinally movable on said frame,
key vise and cutter means mounted for relative longitudinal movement therebetween in accordance with longitudinal movement of said carriage,
rotatable cam means having a cam track,
motive means connected to rotate said cam means,
a cam follower cooperable with said cam,
means connecting one of said cam and follower to said carriage to impart movement thereto upon rotation of said cam,
said cam track having a continuous thread of first and second sections,
said first section extending from near a first end to near a second end of said cam means and being of a first pitch for rapid traverse movement of said carriage,
and said second section crossing said first section at an angle and being of a second pitch less than said first pitch for slow feed movements for cutting of a key by the cutter means.

2. A key machine drive as set forth in claim 1, including a third section in said continuous cam track,
and said thrid section being a rapid traverse section crossing said first section at an angle and being of a pitch greater than said second pitch to rapidly traverse the carriage to a starting position.

3. A key machine drive as set forth in claim 1, wherein said cam means includes a cam drum,
said cam track being a helical path on said drum.

4. A key machine drive as set forth in claim 2, wherein said seond and third sections extend in succession from near one end of said drum to near the other end of said drum.

5. A key machine drive as set forth in claim 1, wherein said cam means is journalled for rotation in said frame,
and said connecting means connecting said cam follower to said carriage to longtudinally move said carriage.

6. A key machine drive as set forth in claim 1, wherein said motive means includes a motor and speed reducer drive mounted in said frame having an input from said motor and an output to said cam means.

7. A key machine drive as set forth in claim 1, including pivot means connecting said cam follower to said carriage and permitting pivotal motion of said cam follower relative to said carriage to permit the cam follower to follow the changing pitch of said cam track.

8. A key machine drive as set forth in claim 1, including means mounting said key vise and cutter means for relative lateral movement therebetween,
a second cam surface on said cam means,
and a second cam follower cooperating with said second cam surface and connected to provide said relative lateral movement between said key vise and cutter means.

9. A key machine drive as set forth in claim 8, wherein said second cam surface includes a disc cam having said cam surface on the outer periphery thereof.

10. A key machine drive as set forth in claim 8, including means synchronizing said cam track and said second cam surface to relatively laterally move said key vise and cutter means during cooperation of said first cam follower with said first section of said cam track.

* * * * *